US005794249A

United States Patent [19]
Orsolini et al.

[11] Patent Number: 5,794,249
[45] Date of Patent: Aug. 11, 1998

[54] AUDIO/VIDEO RETRIEVAL SYSTEM THAT USES KEYWORD INDEXING OF DIGITAL RECORDINGS TO DISPLAY A LIST OF THE RECORDED TEXT FILES, KEYWORDS AND TIME STAMPS ASSOCIATED WITH THE SYSTEM

[75] Inventors: Garry S. Orsolini, Fair Oaks; Richard D. Bowers, Roseville, both of Calif.

[73] Assignee: Hewlett-Packard Company, Palo Alto, Calif.

[21] Appl. No.: 576,106

[22] Filed: Dec. 21, 1995

[51] Int. Cl.⁶ .................................................. G06F 17/30
[52] U.S. Cl. ........................ 707/104; 707/1; 345/328; 704/251
[58] Field of Search .................... 395/613, 60; 707/1, 707/104; 704/251, 231; 345/328

[56] References Cited

U.S. PATENT DOCUMENTS

| 5,136,655 | 8/1992 | Bronson | 704/270 |
|---|---|---|---|
| 5,357,596 | 10/1994 | Takebayashi et al. | 704/275 |
| 5,404,316 | 4/1995 | Klingler et al. | 345/328 |
| 5,428,774 | 6/1995 | Takahashi et al. | 707/101 |
| 5,535,063 | 7/1996 | Lamming | 360/4 |
| 5,550,966 | 8/1996 | Drake et al. | 707/104 |
| 5,606,643 | 2/1997 | Balasubramanian | 704/243 |
| 5,649,060 | 7/1997 | Ellozy et al. | 704/278 |

FOREIGN PATENT DOCUMENTS

| 01253027 | 9/1989 | European Pat. Off. . |
|---|---|---|
| 0507 743 A2 | 10/1992 | European Pat. Off. . |
| 0 649 144 A1 | 4/1995 | European Pat. Off. . |
| WO 92/11634 | 7/1992 | WIPO . |
| WO 96/12239 | 4/1996 | WIPO ............ G06F 17/30 |

OTHER PUBLICATIONS

IBM Techncial DIsclosure Bulletin, vo. 33, No. 10A, Mar. 1, 1991, pp. 295-296, "Correlating Audio and Moving Image Tracks".

H. Wactlar, et al., "Intelligent Access to Digital Video: Informedia Project", Computer, May 1, 1996, pp. 46-52.

QBIC Project by IBM Corporation, having a business address of 650 Harry Road, San Jose, California 95120; internet address http://wwwqbic.almaden.ibm.com/%7eqbic/qbic.html., no date.

Primary Examiner—Thomas G. Black
Assistant Examiner—Greta L. Robinson

[57] ABSTRACT

A recording is indexed by keywords. In order to perform the indexing, an audio portion of the recording is transcribed to produce text in a text file. A time stamp is associated with each word in the text. Each time stamp indicates a time in the recording at which occurs an associated word. Once a recording has been indexed, the recording may be searched along with other recordings. For example, in response to a user choosing a keyword, a text file for each recording is searched for occurrences of the keyword. At the conclusion of the search, each recording which includes an occurrence of the keyword is listed. When a user selects a first recording and a particular occurrence of the keyword, the first recording is played starting slightly before a time corresponding to a first time stamp associated with the particular occurrence of the keyword in the first recording. In response to control sequences, prior and next occurrences of the keyword can be observed in one or multiple recordings.

11 Claims, 6 Drawing Sheets

Microfiche Appendix Included
(3 Microfiche, 173 Pages)

AUDIO/VIDEO RETRIEVAL SYSTEM THAT USES KEYWORD INDEXING OF DIGITAL RECORDINGS TO DISPLAY A LIST OF THE RECORDED TEXT FILES, KEYWORDS AND TIME STAMPS ASSOCIATED WITH THE SYSTEM

BACKGROUND

The present invention concerns performing content searches within digital audio and audio-video recordings, particularly using keywords to index digital audio and audio-video recordings.

Improvements in storage and compression technologies have allowed a revolution in multimedia. Audio recordings are now often stored in digital format. In addition, it is now feasible to convert full length movies into digital audio-video (video) recordings for replay. Using digital video, a user may, with off-the-shelf software products, access and edit full-screen, full-motion video recordings.

In order to make the best use of a computer's ability to manipulate digital audio and audio-video recordings, it is desirable to have some way to perform content searches. Currently, the ability to perform content searching is significantly limited or non-existent.

There exists some limited ability in the art to perform content searches of images. See for example, the QBIC Project by IBM Corporation, having a business address of 650 Harry Road, San Jose, Calif. 95120. However, such searching of images on content is limited to visual content and is not capable of performing content searches on digital audio recordings.

SUMMARY OF THE INVENTION

In accordance with the preferred embodiment of the present invention, a recording is indexed by keywords. In order to perform the indexing, an audio portion of the recording is transcribed to produce text in a text file. The transcription may be performed, for example, manually by a transcriber or using speech recognition technology.

After transcription, a time stamp is associated with each word in the text. Each time stamp indicates a time in the recording at which occurs an associated word. The time stamps may be added to the text file, for example using speech recognition technology.

Alternately, the time stamps may be added to the text file by an operator using a computing system. For example, the text is displayed in a first window of a computer display. The recording is displayed in a second window of the computer display. Upon the operator selecting a selected word of the text in the first window, a time stamp is added to the text file which indicates an elapsed time from a beginning of the recording until selection by the operator of the selected word. Once the operator has in this way or by some other method assigned time stamps to a subset of words in the text, interpolation may be used to assign time stamps to the remaining words in the text which are not within the subset of words assigned time stamps by the operator.

Once time stamps have been assigned to each word in the text, the words and associated time stamps may be arranged in a balanced tree for efficient access by a search program. Other search techniques can be used instead of the balance tree. For example, a binary tree can be used.

The preferred embodiments of the present invention also provides for keyword searching of a plurality of recordings, each with an associated text file created as described above. In response to a user choosing a keyword, a text file/balanced tree for each recording is searched for occurrences of the keyword. At the conclusion of the search, each recording which includes an occurrence of the keyword is listed. When a user selects a first recording and a particular occurrence of the keyword, the first recording is played starting slightly before a time corresponding to a first time stamp associated with the particular occurrence of the keyword in the first recording.

For example, after searching on a keyword, the recordings are listed as follows. The list of recordings which include an occurrence of the keyword are displayed in a first window of a computer display. One of the recordings from the list of recordings displayed in the first window is highlighted. A user may select which recording is highlighted. In one embodiment, upon a user selecting a particular recording, a first-in-time occurrence of the keyword within the particular recording is played. Keystroke commands may be used to jump to other occurrences. In an alternate embodiment, when a recording displayed in the first window is highlighted, each of the occurrences of the keyword within the highlighted recording is listed. This may be done, for example, in a second window of the computer display.

Various variations may be made to the preferred embodiments of the present invention. For example, in addition to allowing searching on a single keyword, searching may be performed on multiple keywords connected by Boolean logic or may be performed on concepts.

The present invention allows for efficient content searching of recordings. Such content searching is a significant improvement over other currently available schemes to index recordings.

DESCRIPTION OF THE PREFERRED EMBODIMENT

Figure 1:
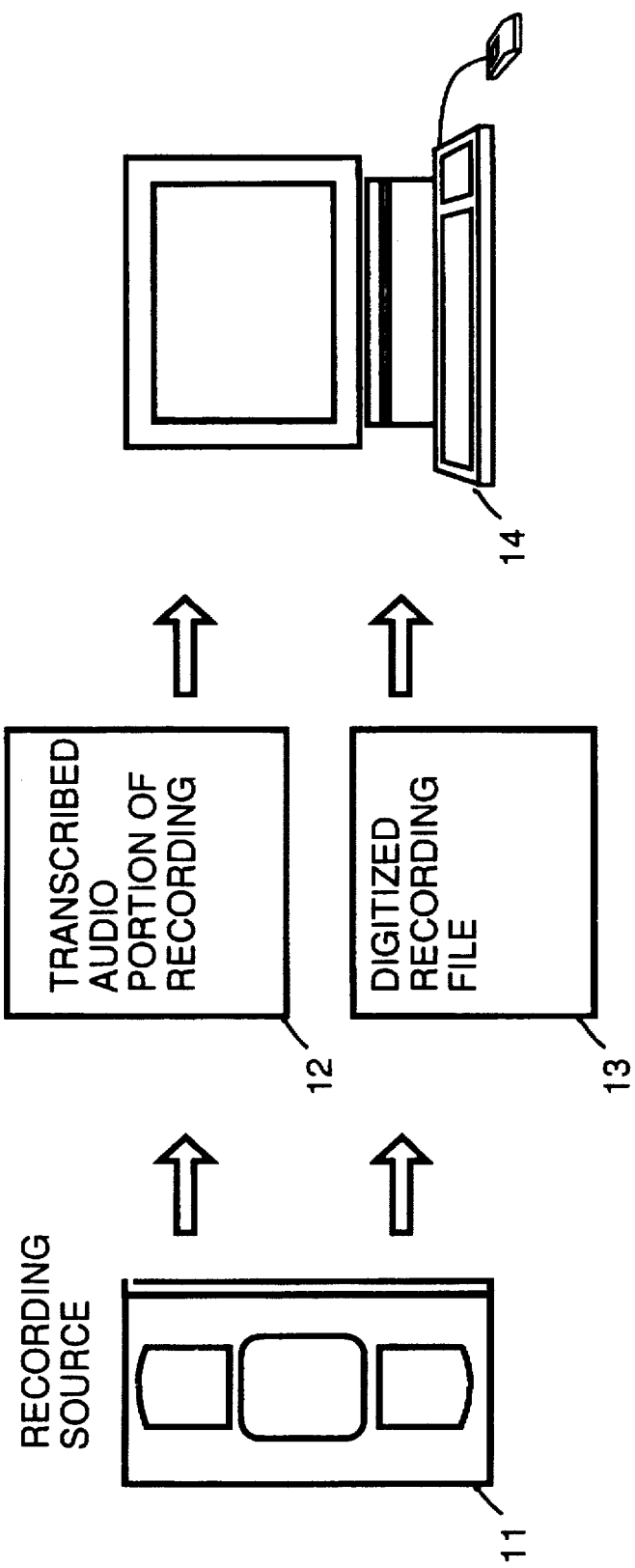
FIG. 1 illustrates steps taken to allow keyword indexing of digital recordings in accordance with the preferred embodiment of the present invention.

FIG. 1 illustrates steps taken to allow keyword indexing of digital recordings. A recording source 11 is digitized and compressed to produce digitized recording file 13. Recording source 11 is, for example, an audio recording or an audio-video recording. When recording source 11 is an audio-video recording, data in digitized recording file 13 is, for example, stored in MPEG-1 format. Digitized recording file 13 may be produced from analog recording source 11 using, for example, OptiVideo MPEG 1 Encoder available from OptiVision, having a business address of 3450 Hillview Ave., Palo Alto, Calif. 94304.

In addition, the audio portion of recording source 11 is transcribed to produce a text file 12 which includes the text.

The transcription may be performed manually. Alternately, the audio portion of recording source 11 may be transcribed directly from recording source 11 or digitized recording file 13 using computerized speech recognition technology such as DragonDictate for Windows available from Dragon Systems, Inc., having a business address of 320 Nevada Street, Newton, Mass. 02160. Text file 12 and digitized recording file 13 are then made available to a computer system 14.

Figure 2:
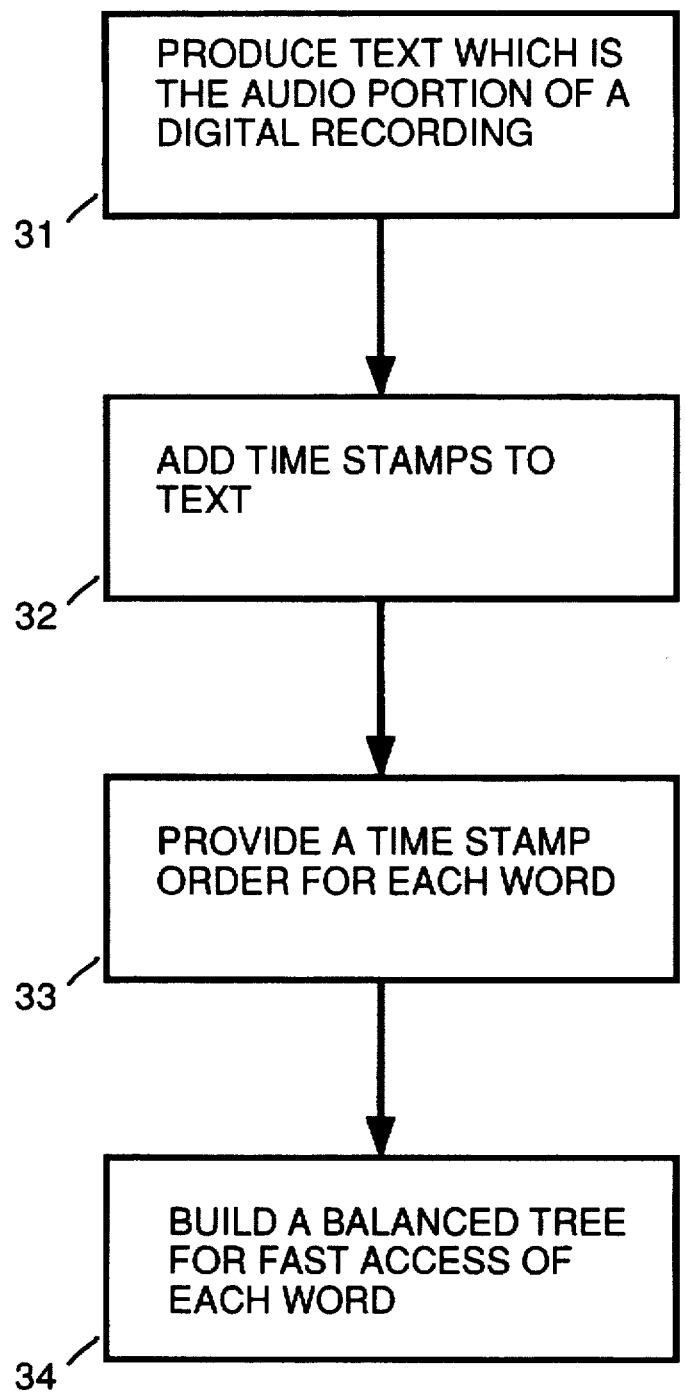
FIG. 2 is a flowchart which shows steps by which text for a digital recording is keyword indexed in accordance with the preferred embodiment of the present invention.

FIG. 2 is a flowchart which shows steps by which text for a digitized recording file 13 is keyword indexed. In a step 31, text is produced which is the audio portion of digitized recording file 13. This text is a result of the transcription described above.

Figure 3:
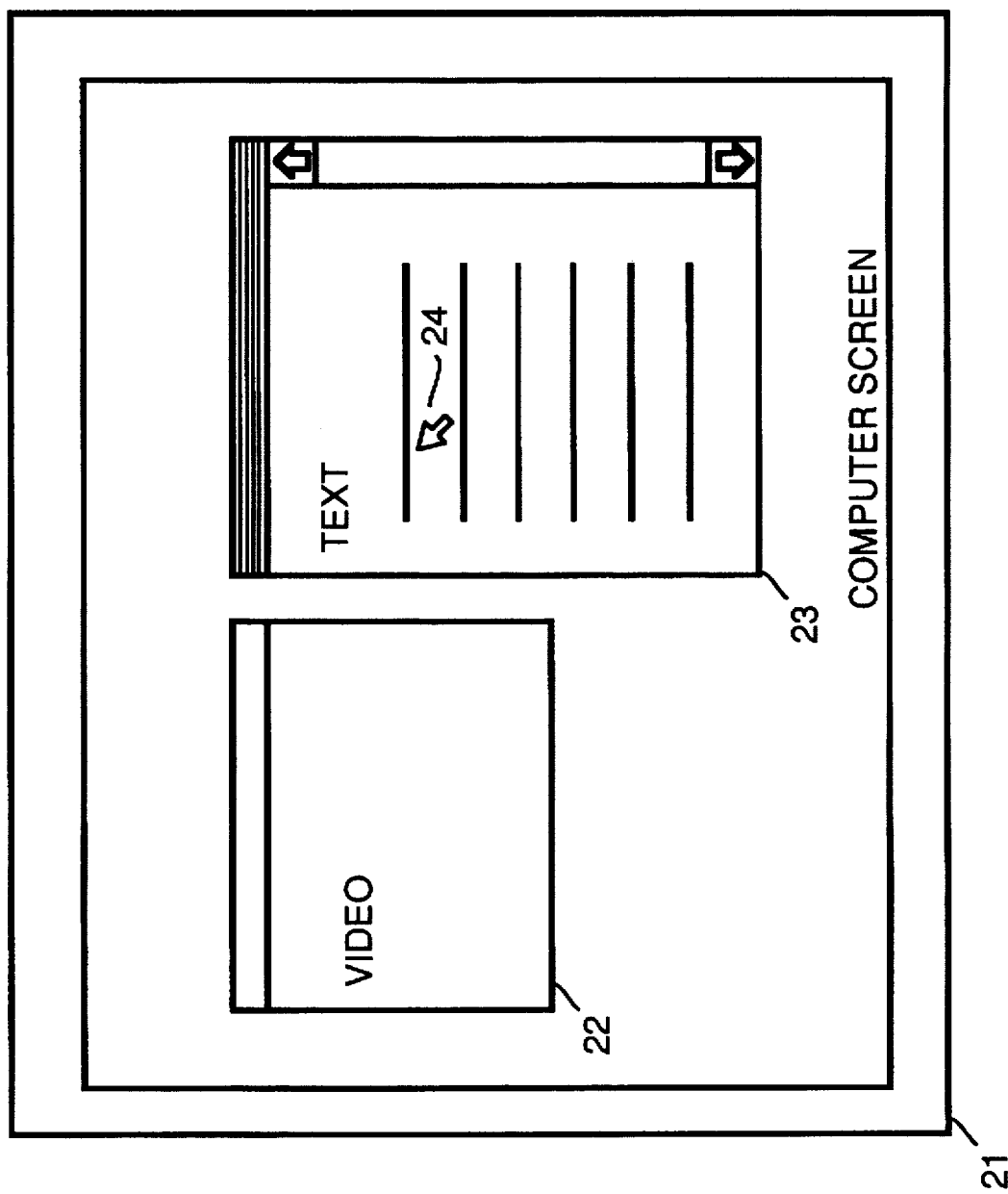
FIG. 3 and FIG. 4 show computing displays which illustrate the preparation of a data base used for keyword indexing of digital recordings in accordance with the preferred embodiment of the present invention.

FIG. 3 illustrates the result of the transcription process. FIG. 3 shows a window 23 in a computer screen 21. Within window 23 is the transcribed text of the audio portion of recording file 13.

In a step 32, shown in FIG. 2, time stamps associated with words in the text are added to the transcribed text. In the preferred embodiment, the time stamps are in milliseconds and indicate elapse of time relative to the starting point of the digital recording within recording file 13.

Placement of time stamps may be performed, for example, with the help of an operator utilizing, on computer 14 (shown in FIG. 1), software specifically designed to add time stamps. For example, the recording is played by computer 14. For an audio-video recording, a window 22 in computer screen 21, as shown in FIG. 3, may be added in which the audio-video recording is played. The operator of computer 14, using cursor 24, selects words as they are spoken in the recording played by computer 14. Whenever the operator selects with cursor 24 a word from the text in window 23, the software running on computer 14 time stamps the word with the current time duration which represents the elapse of time relative to the starting point of the digital recording.

Figure 4:
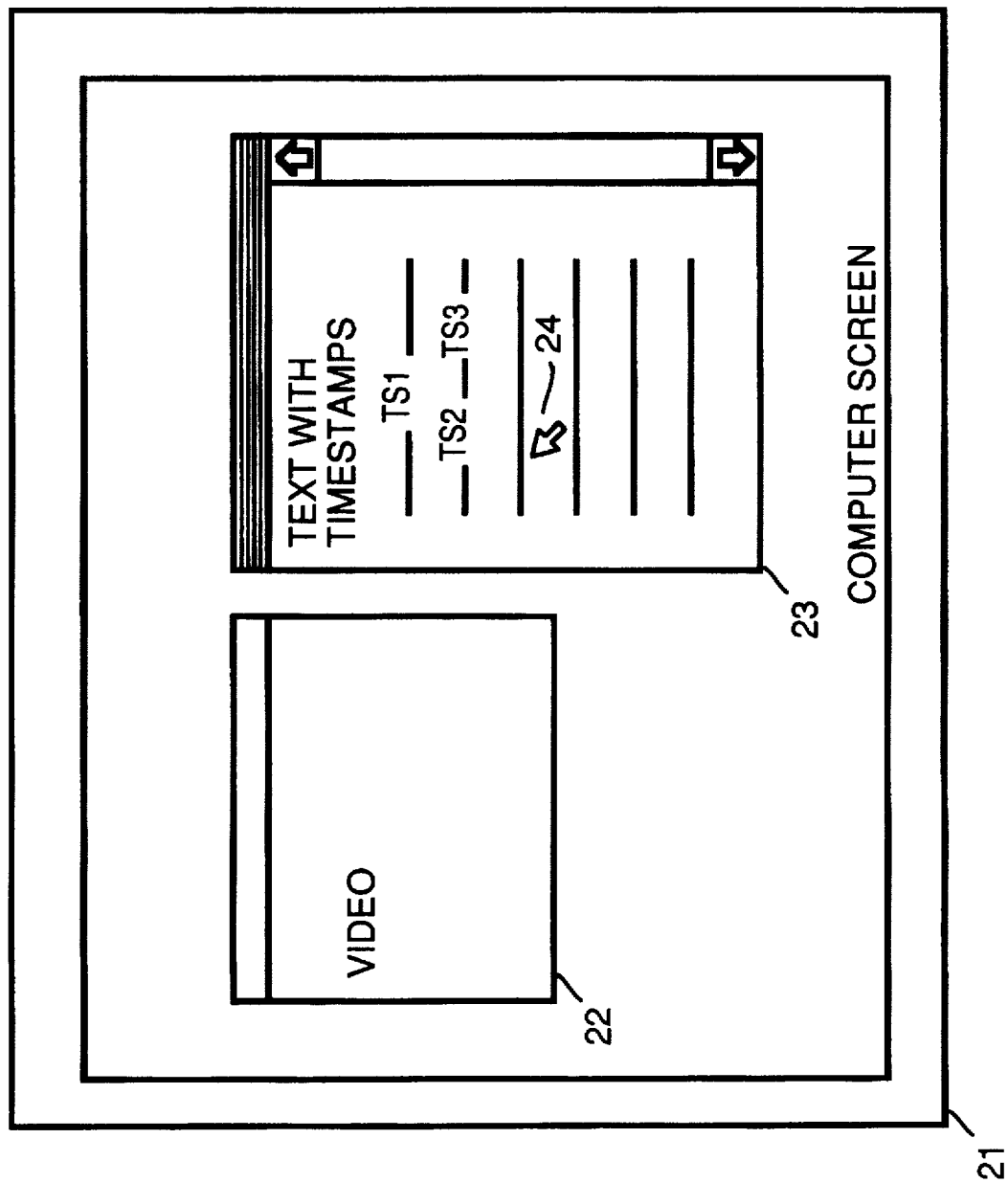

FIG. 4 further illustrates this process. In FIG. 4, time stamps TS1, TS2 and TS3 have been added to text 23 by an operator as described above. Section A (frames 0001 through 0053) of the microfiche appendix includes source code for software which implements the time stamp feature discussed above for audio-video recordings. Alternately, step 32, shown in FIG. 2, may be automated so that speech recognition technology is used to trigger the placement of time stamps within text 23.

After the time stamps have been added to text 23, in a step 33 shown in FIG. 2, every word of text 23 is assigned a time stamp. For words which were not assigned a time stamp in step 32, interpolation is used to determine an appropriate time stamp.

For example, Table 1 below shows a portion of text 23 after the completion of step 32.

TABLE 1

Once::11 upon a time::20 there was a boy::28 named Fred. He went::35 to the forest::44 . . .

In the example given in Table 1, the word "Once" was spoken at 11 milliseconds from the beginning of the audio track of the digital recording. The word "time" was spoken at 20 milliseconds from the beginning of the audio track of the digital recording. The word "boy" was spoken at 28 milliseconds from the beginning of the audio track of the digital recording. The word "went" was spoken at 35 milliseconds from the beginning of the audio track of the digital recording. The word "forest" was spoken at 44 milliseconds from the beginning of the audio track of the digital recording.

In order to assign time stamps to the remainder of the words, interpolation is used. For example, nine milliseconds elapsed between the word "Once" and the word "time". There are two words, "upon", and "a", which occur between "Once" and "time". As a result of the interpolation, the words "upon", and "a" are assigned time stamps of 14 milliseconds and 17 milliseconds, respectively. This is done so that there is allocated three milliseconds between the occurrence of the word "Once" and the word "upon"; there is allocated three milliseconds between the occurrence of the word "upon" and the word "a"; and there is allocated three milliseconds between the occurrence of the word "a" and the word "time".

The words and their time stamps are placed in an output file. For example, the output file may have on each line a single word, separated by a tab character from a time stamp for the word. Table 2 below shows the form of the file for the example text file shown in Table 1 above:

TABLE 2

| Once | 11 |
|---|---|
| upon | 14 |
| a | 17 |
| time | 20 |
| there | 22 |
| was | 24 |
| a | 26 |
| boy | 28 |
| named | 30 |
| Fred | 32 |
| He | 34 |
| went | 35 |
| to | 38 |
| the | 41 |
| forest | 44 |
| . | |
| . | |
| . | |

Section B (frames 0054 through 0062) of the microfiche appendix includes source code for software which implements the interpolation feature discussed above. Alternately, in step 32 every word may be assigned a time stamp, for example using speech recognition technology, so that no interpolation is necessary. Using speech recognition technology, words may be transcribed and time stamped simultaneously. Alternately, speech recognition technology may be used in a separate pass in which time stamps are added to a transcription of the text. When used in a separate pass to add time stamps to words in a text, the speech recognition software adds time stamps for unrecognized words by interpolation, as described above.

In a step 34 shown in FIG. 2, a balanced tree is built which allows fast access of words within the output file. The balanced tree is built, for example, using an algorithm known in the art. See for example, Robert Sedgewick, "Algorithms in C++", Addison-Wesley Publishing Company, 1992, pp. 215–229. Section C (frames 0063 through 0172) of the microfiche appendix includes source code for software which implements the construction of the balanced tree as set out in step 34. Alternately, a binary tree or other searching algorithm may be used. In other embodiments, searching may be performed directly on the output file constructed in step 33.

The balanced tree constructed in step 34 serves as a keyword index of the digital recording. The balanced tree is accessed to locate where a word is spoken in the movie.

Figure 5:
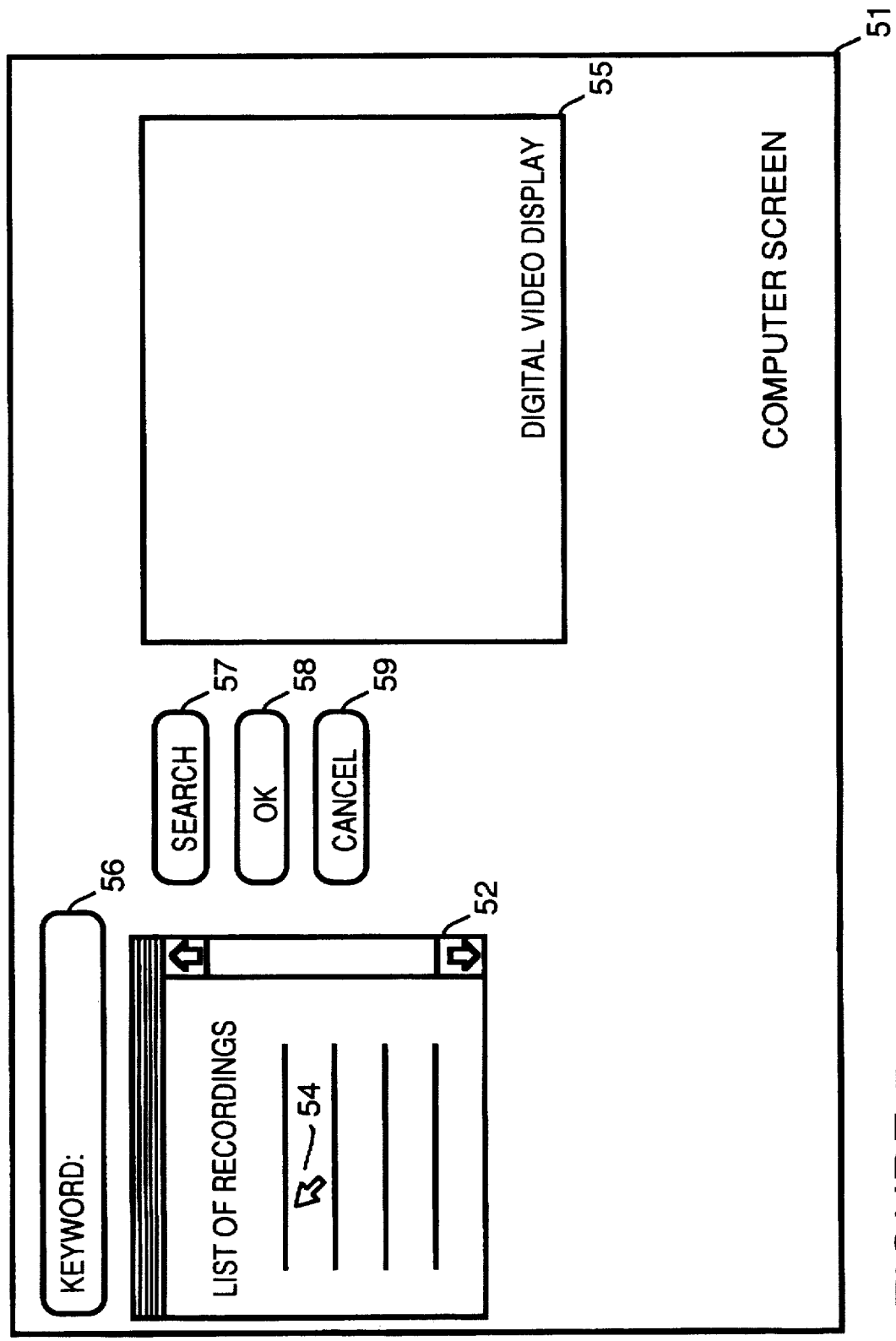
FIG. 5 shows a computing display used for keyword index searches of a video library in accordance with the preferred embodiment of the present invention.

For example, FIG. 5 illustrates an interface on a computer screen 51 which utilizes the keyword index constructed as described above. In a box 56, a user types one or more keywords connected by Boolean variables. In a window 52, recordings are listed in which the keyword(s) appear. The number of "hits" of a keyword appears is listed next to the recording. In the preferred embodiment, the recordings are listed in descending order by the number of keyword occurrences. A user selects a recording using cursor 54, cursor keys, or some other way. When a recording is selected, for example using an "OK" button 58 by the user, the portion of the selected recording (listed in window 52) in which the first occurrence of the selected keyword appears is played. For an audio-video recording, the visual portion is displayed in display window 55. The portion of the recording is displayed for a configurable duration (e.g., two seconds) starting, for example, one second before the occurrence of the keyword. Using keyboard commands, a user can continue viewing the recording, fast forward, reverse, skip to the next occurrence of the keyword, go back to the last occurrence of the keyword, continue playing and so on. The interface also includes a "cancel" button 59. Section C (frames 0063 through 0172) of the microfiche appendix includes source code for software which (in addition to implementing the construction of the balanced tree) implements the keyword searching of recordings, as discussed above.

Figure 6:
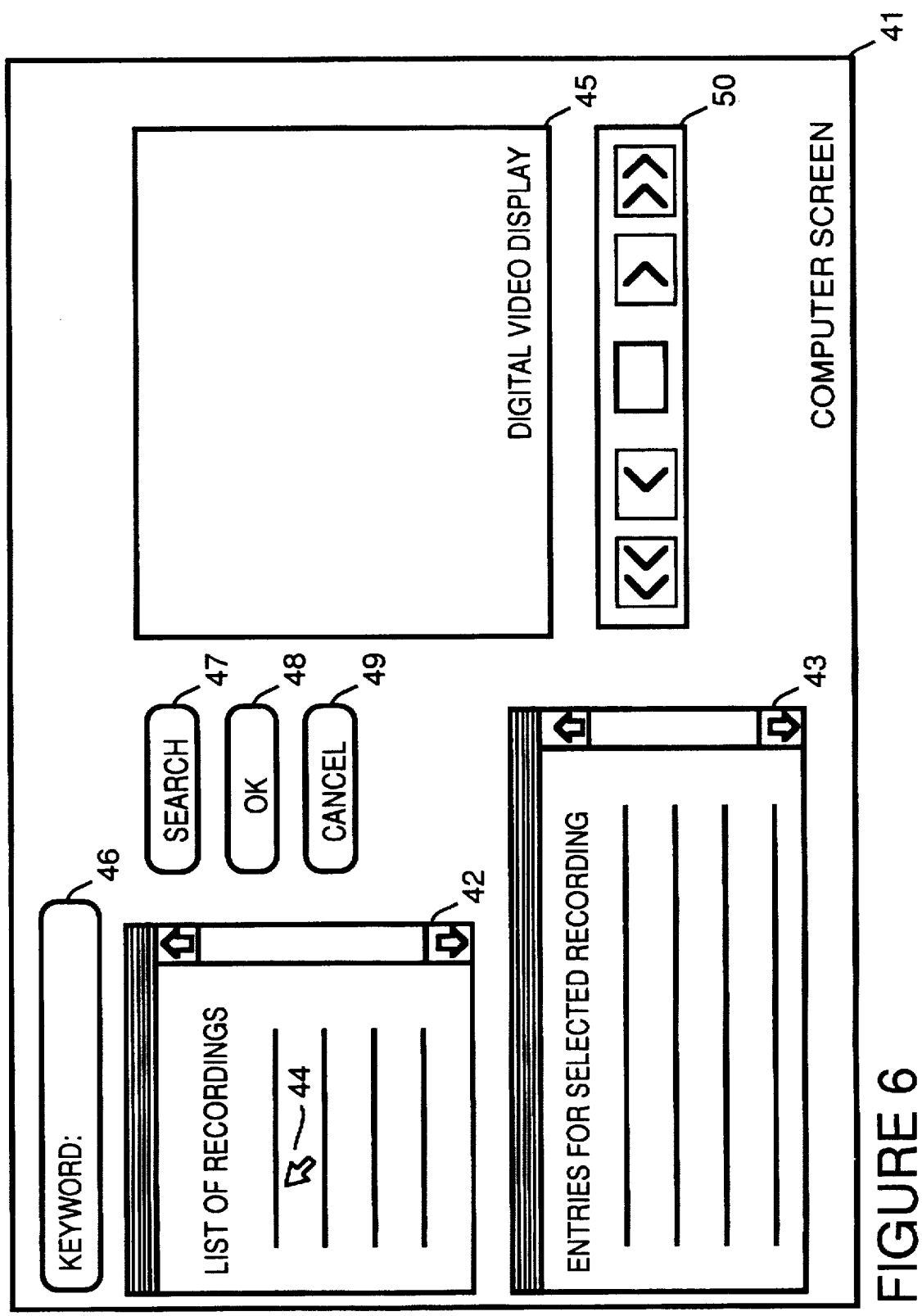
FIG. 6 shows a computing display used for keyword index searches of a video library in accordance with an alternate preferred embodiment of the present invention.

The interface in FIG. 5, may be enhanced to include additional features. For example, FIG. 6 illustrates an interface on a computer screen 41 which utilizes the keyword index constructed as described above. In a box 46, a user types one or more keywords connected by Boolean variables. In a window 42, recordings are listed in which the keyword(s) appear. The number of times a keyword appears in a recording is listed next to the recording. In the preferred embodiment, the recordings are listed in descending order by the number of keyword occurrences. A user selects a recording using cursor 44, cursor keys, or some other way. When a recording is selected, in a window 43, a list of all the occurrences for the keyword(s) are listed. In one embodiment, a fragment of text, along with the time stamp, are displayed for each occurrence. Alternately, only the keyword and time stamp, or only the time stamp are displayed for each occurrence.

Upon selection of an "OK" button 48 by the user, the portion of the selected recording (in window 44) in which the selected keyword (in window 43) appears is played in a digitized recording display window 45. The portion of the recording is displayed for a configurable duration (e.g., two seconds) starting, for example, one second before the occurrence of the keyword. Using a control panel 50, a user can continue viewing the recording, fast forward, reverse, skip to the next occurrence of the keyword, go back to the last occurrence of the keyword, continue playing and so on. The interface also includes a "cancel" button 49.

In addition to searching on one or more keywords connected by Boolean variables, the balanced tree formed in step 34 (shown in FIG. 2) may also be searched using concept based searching techniques, for example using Metamorph available from Thunderstone Software-EPI, Inc. having a business address of 11115 Edgewater Drive, Cleveland, Ohio 44102.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

Section A (frames 0001 through 0053) of the microfiche appendix includes source code for software which implements the time stamp feature discussed above for audio-video recordings.

Section B (frames 0054 through 0062) of the microfiche appendix includes source code for software which implements the interpolation feature discussed above.

Section C (frames 0063 through 0172) of the microfiche appendix includes source code for software which implements the construction of a balanced tree and implements the keyword searching of recordings described above.

We claim:

1. A method for accessing selections within a plurality of recordings, the method comprising the following steps:

(a) in response to a user choosing a keyword, searching a plurality of text files for occurrences of the keyword, wherein text files are associated with recordings so that for each of the plurality of recordings, one text file from the plurality of text files includes a text of an audio portion of the recording, each word in each text file being associated with a time stamp which indicates an approximate location in an associated recording of an occurrence of the word;

(b) listing recordings which include an occurrence of the keyword; and, (c) upon a user selecting a first recording and a particular occurrence of the keyword, playing the first recording starting slightly before a time corresponding to a first time stamp associated with the particular occurrence of the keyword in the first recording.

2. A method as in claim 1 wherein in step (c) upon a user selecting the first recording, a first-in-time occurrence of the keyword within the first recording is automatically selected as the particular occurrence of the keyword.

3. A method as in claim 1 wherein step (b) includes the following substeps:

(b.1) listing in a first window the recordings which include an occurrence of the keyword;

(b.2) highlighting one of the recordings from the recordings listed in the first window; and, (b.3) listing each of the occurrences of the keyword within the recording highlighted in substep (b.2).

4. A method as in claim 1 wherein words of the text of the audio portion of each recording and associated time stamps arranged in a balanced tree based on occurrences of each word of the text.

5. A system for accessing selections within a plurality of recordings, comprising:

a plurality of text files, each text file from the plurality of text files includes a text of an audio portion of an associated recording from the plurality of recordings;

search means, coupled to the text files for, in response to a user selecting a keyword, searching the text files for occurrences of the keyword; and, recording play means for, in response to a user selecting a particular occurrence of the keyword within a first recording, playing the first recording starting slightly before a time corresponding to the particular occurrence of the keyword in the first recording.

6. A system as in claim 5 wherein each word in each text file being associated with a time stamp which indicates an approximate location in an associated recording of an occurrence of the word.

7. A system as in claim 5 wherein text within the text files is stored in a balanced tree.

8. A system as in claim 5 wherein the search means includes:

a first keyword display which accepts from a user a specification of a particular keyword; and, a first window which displays a list of recordings which include an occurrence of the particular keyword.

9. A system as in claim 8 wherein the search means additionally includes:

a second window which displays occurrences of the keyword within a recording highlighted in the first window.

10. A system as in claim 5 wherein the search means includes the ability to search on a plurality of keywords connected by Boolean logic.

11. A system as in claim 5 wherein the search means includes the ability to perform concept based searches on the keyword.

* * * * *